(12) United States Patent
Chang

(10) Patent No.: US 11,777,771 B1
(45) Date of Patent: Oct. 3, 2023

(54) BLE PROTOCOL-BASED BATTERY-FREE MULTI-MODE TRANSCEIVER

(71) Applicant: Microaiot, Ltd. Hangzhou (CN), Zhejiang (CN)

(72) Inventor: Ziyi Chang, Zhejiang (CN)

(73) Assignee: Microaiot, Ltd., Hangzhou (CN), Zhejiang (CN)

( * ) Notice: Subject to any disclaimer, the term of this patent is extended or adjusted under 35 U.S.C. 154(b) by 0 days.

(21) Appl. No.: 18/173,013

(22) Filed: Feb. 22, 2023

Related U.S. Application Data

(63) Continuation of application No. PCT/CN2022/113275, filed on Aug. 18, 2022.

(30) Foreign Application Priority Data

May 19, 2022 (CN) .......................... 202210543289.6

(51) Int. Cl.
*H04L 27/20* (2006.01)
*H04L 27/14* (2006.01)

(52) U.S. Cl.
CPC .......... *H04L 27/2017* (2013.01); *H04L 27/14* (2013.01)

(58) Field of Classification Search
CPC ....... H04L 27/14; H04L 27/2017; H04B 1/16; H04B 1/18; H04B 1/1638
See application file for complete search history.

(56) References Cited

U.S. PATENT DOCUMENTS

| 10,951,446 | B2 * | 3/2021 | Kellogg | H04L 27/26 |
| 2016/0196455 | A1 * | 7/2016 | Gudan | H04B 5/0031 |
| | | | | 340/10.5 |
| 2016/0365890 | A1 * | 12/2016 | Reynolds | H04L 27/2602 |
| 2019/0148984 | A1 * | 5/2019 | Bevelacqua | H02J 50/23 |
| | | | | 307/104 |
| 2022/0131410 | A1 * | 4/2022 | Benbuk | H02J 50/001 |

FOREIGN PATENT DOCUMENTS

CN 107204785 9/2017
WO WO/2017/172899 A1 * 10/2017

* cited by examiner

*Primary Examiner* — Siu M Lee
(74) *Attorney, Agent, or Firm* — JCIPRNET

(57) ABSTRACT

The present invention belongs to the field of IoT (Internet of Things) chips, and discloses a BLE protocol-based battery-free multi-mode transceiver including a wireless energy harvester module, a power management module, a transmitter, a receiver and a backscattering module, where the wireless energy harvester module supplies power to the whole transceiver; the power management module provides required stable currents and voltages for circuits; the transmitter modulates a baseband signal inputted by an external device into a GFSK modulated Bluetooth intermediate frequency signal compatible to a BLE protocol, modulates a received continuous waveform signal by using a backscattering technology, backscatters digital information compatible to the BLE protocol, and transmits a Bluetooth radio frequency signal; the receiver receives the Bluetooth radio frequency signal, amplifies the Bluetooth intermediate frequency signal in an output of the rectifier, and demodulates the Bluetooth intermediate frequency signal to a Bluetooth baseband signal.

10 Claims, 4 Drawing Sheets

BLE PROTOCOL-BASED BATTERY-FREE MULTI-MODE TRANSCEIVER

CROSS-REFERENCE TO RELATED APPLICATIONS

This application is a continuation of international PCT application serial no. PCT/CN2022/113275, filed on Aug. 18, 2022, which claims the priority benefit of China application no. 202210543289.6, filed on May 19, 2022. The entirety of each of the above-mentioned patent applications is hereby incorporated by reference herein and made a part of this specification.

BACKGROUND

1. Technical Field

The present invention belongs to the field of IoT (Internet of Things) chips, and particularly relates to a BLE protocol-based battery-free multi-mode transceiver.

2. Description of Related Art

The Internet of Things (IoT) has a wide range of applications today, and related devices thereof are ubiquitous in every aspect of our lives, such as smart home, environmental monitoring, industrial manufacturing, asset management, and the like. An IoT device usually needs a stable wireless connection to complete trusted information transmission between devices. Meanwhile, in order to meet more application scenarios, the IoT has high requirements for energy consumption and portability of devices. Therefore, a transceiver with an information transmission function gradually develops in a trend towards low energy and miniaturization. In order to enable the transceiver to be used more widely, a common choice is the use of an existing wireless network infrastructure. Otherwise, the deployment of custom access points (AP) will greatly increase the cost. Bluetooth is a communication protocol that supports short-distance communication of devices, and is commonly used in low-energy scenes, the utilization rate of Bluetooth is extremely high, and currently universal devices such as mobile phones, tablet computers, notebook computers and the like all support Bluetooth-based communication. Therefore, a Bluetooth protocol based low-energy miniature transceiver has a wide application prospect.

In view of a goal of reducing energy consumption, the present invention designs the transceiver based on the BLE (Bluetooth Low Energy) protocol. The BLE protocol aims at reducing energy consumption and cost under the same communication distance, and is applicable to short-distance low-energy application scenarios such as medical care, exercise and fitness, entertainment facilities and the like. BLE works at a 2.4 GHz ISM (Industrial, Scientific, and Medical) frequency band with 40 channels (37 data channels and 3 advertising channels) for transmitting data, and each channel has a bandwidth of 2 MHz and supports communication of 1 Mbps. The modulation of BLE is GFSK (Gaussian frequency shift keying) modulation. The present invention designs a battery-free multi-mode transceiver based on the BLE protocol.

SUMMARY

The objective of the present invention is to provide a BLE protocol-based battery-free multi-mode transceiver, so as to solve the above-mentioned technical problem.

To solve the above-mentioned technical problem, a specific technical solution of the BLE protocol-based battery-free multi-mode transceiver of the present invention is as follows:

The BLE protocol-based battery-free multi-mode transceiver includes a wireless energy harvester module, a power management module, a transmitter, a receiver and a backscattering module, where the wireless energy harvester module is connected to the power management module, the power management module is connected to the transmitter and the receiver, and the transmitter is connected to the backscattering module;

the wireless energy harvester module includes an antenna, a matching/resonant network and a rectifier, where the antenna is connected to the matching/resonant network, the matching/resonant network is connected to the rectifier, and a continuous waveform signal transmitted by a Hub is rectified to a DC voltage $V_{DC}$ through the rectifier so as to supply power for the whole transceiver;

the power management module includes a bandgap reference, a low-dropout regulator L1 and a low-dropout regulator L2, where the rectifier is connected to the bandgap reference, the bandgap reference is respectively connected to the low-dropout regulator L1 and the low-dropout regulator L2, the low-dropout regulator L2 is connected to the transmitter, and the low-dropout regulator L1 is connected to the receiver; and the power management module provides a required stable current $I_{REF}$ and a required voltage $V_{DD}$ for a circuit;

the transmitter modulates a baseband signal inputted by an external device into a GFSK modulated Bluetooth intermediate frequency signal compatible to the BLE protocol, modulates a received continuous waveform signal by using a backscattering technology, backscatters digital information compatible to the BLE protocol, and transmits a Bluetooth radio frequency signal;

the rectifier is connected to the receiver, and the receiver receives the Bluetooth radio frequency signal, detects a fluctuation in an output voltage signal $V_{DC}$ of the rectifier and amplifies the fluctuation, i.e., amplifying the Bluetooth intermediate frequency signal in an output of the rectifier, and then demodulates the Bluetooth intermediate frequency signal to a Bluetooth baseband signal; and the backscattering module uses a switching or varactor diode to further modulate the Bluetooth intermediate frequency signal to a radio frequency and backscatter the Bluetooth intermediate frequency signal.

Further, the transmitter includes a data interface, a Bluetooth packet forming module and a GFSK modulation module, where the data interface is connected to the Bluetooth packet forming module, and the Bluetooth packet forming module is connected to the GFSK modulation module; the data interface is configured to input data that needs to be transmitted by IoT devices into the transceiver; the Bluetooth packet forming module converts incoming bit stream data into a Bluetooth packet compatible to the Bluetooth communication protocol; and the GFSK modulation module modulates a Bluetooth packet signal to an intermediate frequency signal and connects the Bluetooth packet signal to the backscattering module, further modulates the Bluetooth intermediate frequency signal to a radio frequency and backscatters the Bluetooth intermediate frequency signal.

Further, the data interface is an SPI, an I2C interface or an UART data interface.

Further, the receiver includes a band-pass filter, an amplifier and a demodulator; where the band-pass filter is connected to the amplifier, and the amplifier is connected to the demodulator; a passband of the band-pass filter is a Bluetooth intermediate frequency signal frequency, and the band-pass filter filters out high-frequency carriers; and the amplifier amplifies the Bluetooth intermediate frequency signal, and the demodulator demodulates the Bluetooth intermediate frequency signal into a Bluetooth baseband signal.

Further, the transceiver includes a transmitting mode, a receiving mode and a networking mode; the transceiver can transmit data of the IoT devices to a Bluetooth receiving device, and can also receive a Bluetooth radio frequency signal transmitted from the Hub for setting the IoT devices; and meanwhile, the transceiver supports the networking mode, enabling the IoT devices to communicate with each other.

Further, when the transceiver is in the transmitting mode, the low-dropout regulator L1 and the receiver are turned off, the low-dropout regulator L2 and the transmitter are turned on, the antenna receives the continuous waveform signal transmitted by the Hub, and the transmitter inputs the baseband signal from the external device, modulates the baseband signal into a GFSK modulated Bluetooth intermediate frequency signal compatible to the BLE protocol, connects the modulated Bluetooth intermediate frequency signal to the backscattering module, modulates the matching/resonant network by the backscattering module to backscatter the signal, and receives the Bluetooth radio frequency signal by a Bluetooth-enabled device.

Further, the Hub transmits a continuous waveform signal with a frequency of 2397.75 MHz, the wireless energy harvester module collects the continuous waveform signal and supplies power to the whole transceiver, the Bluetooth baseband signal is a 1 Mbps bit stream and generates a Bluetooth packet by the transmitter, then the Bluetooth packet is subjected to GFSK modulation to generate an intermediate frequency signal with a frequency of 4-4.5 MHz, the intermediate frequency signal is connected to the backscattering module, and the matching/resonant network is modulated by the backscattering module to reflect a Bluetooth signal with a center frequency of 2402 MHz and a 37 advertising channel in the BLE protocol; and the Bluetooth signal is received by a Bluetooth communication enabled device.

Further, when the transceiver is in the receiving mode, the low-dropout regulator L2 and the transmitter are turned off, at this time, an output of the transmitter is a low level, and the backscattering module is turned off; and the low-dropout regulator L1 and the receiver are turned on, the antenna receives the Bluetooth radio frequency signal transmitted by the Hub, the Bluetooth intermediate frequency signal is extracted and amplified in the output of the rectifier, and the Bluetooth intermediate frequency signal is demodulated to a Bluetooth baseband signal.

Further, the Bluetooth signal transmitted by the Hub has a Bluetooth envelope with an intermediate frequency signal of 4-4.5 MHz, a carrier thereof is 2397.75 MHz, and the intermediate frequency signal is modulated to a carrier of 2397.75 MHz at the Hub to obtain a Bluetooth radio frequency signal with a frequency of 2402 MHz and a 37 advertising channel in the BLE protocol; the signal is transmitted to the transceiver in a receiving mode; and the wireless energy harvester module collects the Bluetooth radio frequency signal and supplies power to the whole transceiver, and at the same time, an envelope of the signal is obtained in the output of the rectifier, i.e., a Bluetooth intermediate frequency signal, high-frequency carriers are filtered out by using the band-pass filter, the Bluetooth intermediate frequency signal is amplified by using the amplifier, and the Bluetooth intermediate frequency signal is demodulated to a Bluetooth baseband signal by using the demodulator.

Further, the transceiver is in the networking mode, the networking mode consists of more than two transceivers, and one of the transceivers is in the transmitting mode, receives the continuous waveform signals transmitted by the Hub, and transmits the Bluetooth radio frequency signal; and the other transceivers are in the receiving mode, receive the Bluetooth radio frequency signals transmitted by a previous transceiver, and demodulate the Bluetooth radio frequency signals to Bluetooth baseband signals.

The BLE protocol-based battery-free multi-mode transceiver of the present invention has the following advantages: in order to realize the design of a battery-free IoT transceiver, a battery-free transceiver supporting multiple modes is invented based on the BLE protocol. The transceiver supplies power to a system by use of a wireless energy harvester module, and includes a receiver and a transmitter. The transceiver supports three working modes simultaneously: a transmitting mode, a receiving mode and a networking mode. The transceiver can transmit data of the IoT devices to a Bluetooth receiving device, and can also receive a Bluetooth radio frequency signal transmitted from the Hub for setting the IoT devices. Meanwhile, the transceiver supports the networking mode, so that the IoT devices can communicate with each other.

DESCRIPTION OF THE EMBODIMENTS

To better understand the objective, structure, and function of the present invention, a BLE protocol-based battery-free multi-mode transceiver of the present invention is described in detail below in combination with the accompanying drawings.

Figure 1:
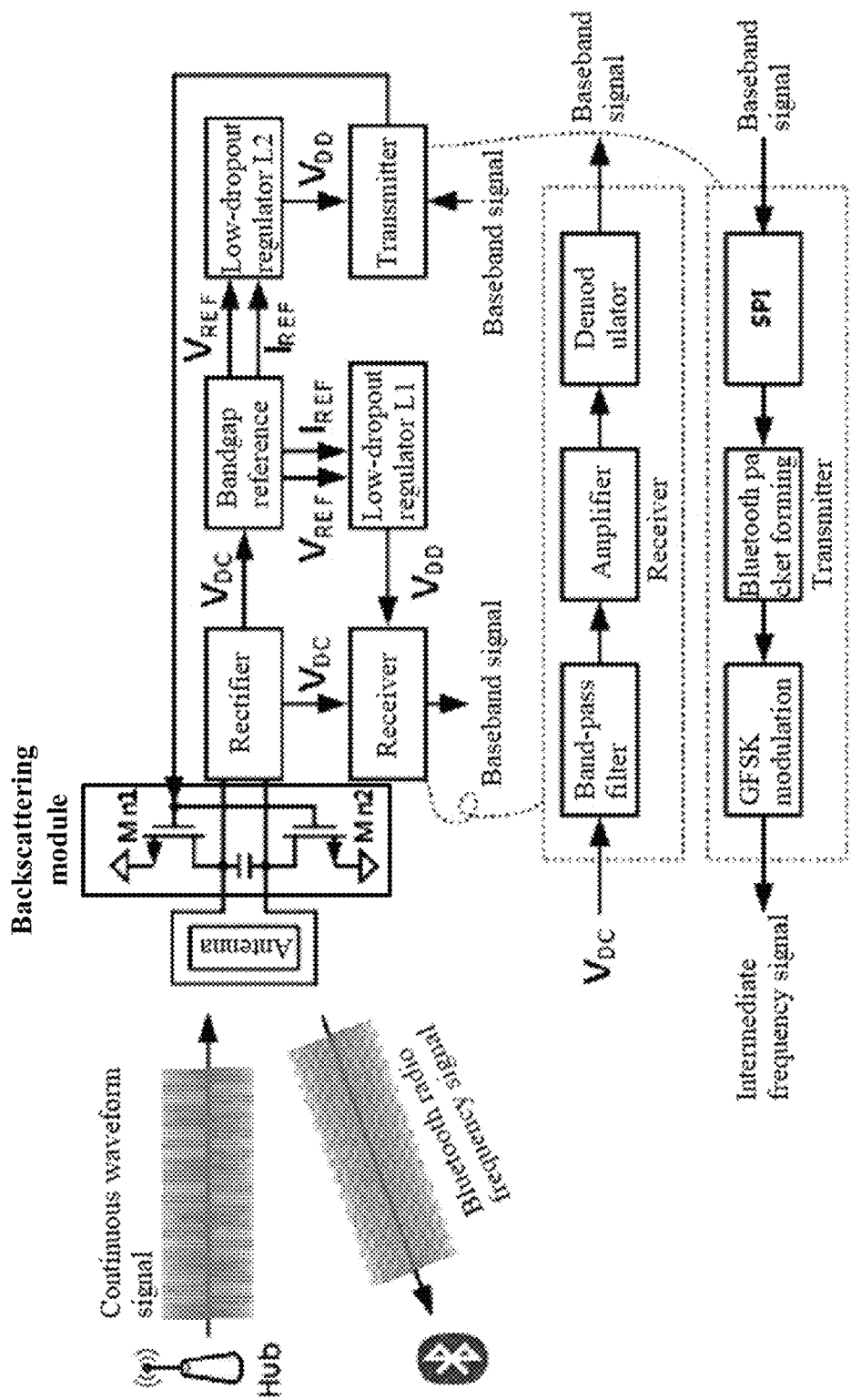
FIG. 1 is a schematic circuit diagram of a BLE protocol-based battery-free multi-mode transceiver according to the present invention.

As shown in FIG. 1, the BLE protocol-based battery-free multi-mode transceiver of the present invention includes a wireless energy harvester module, a power management module, a transmitter, a receiver and a backscattering module.

The wireless energy harvester module is connected to the power management module, the power management module is connected to the transmitter and the receiver, and the transmitter is connected to the backscattering module. The wireless energy harvester module includes an antenna, a matching/resonant network and a rectifier, where the antenna is connected to the matching/resonant network, the matching/resonant network is connected to the rectifier, and a continuous waveform signal transmitted by a Hub is rectified to a DC voltage $V_{DC}$ through the rectifier so as to supply power for the whole transceiver;

the power management module includes a bandgap reference, a low-dropout regulator L1 and a low-dropout regulator L2, where the rectifier is connected to the bandgap reference, the bandgap reference is respectively connected to the low-dropout regulator L1 and the low-dropout regulator L2, the low-dropout regulator L2 is connected to the transmitter, and the low-dropout regulator L1 is connected to the receiver. The power management module provides a required stable current $I_{REF}$ and a required voltage $V_{DD}$ for a circuit;

the transmitter modulates a baseband signal inputted by an external device into a GFSK modulated Bluetooth intermediate frequency signal compatible to a BLE protocol, modulates a received continuous waveform signal by using a backscattering technology, backscatters digital information compatible to the BLE protocol, and transmits a Bluetooth radio frequency signal; and the rectifier is connected to the receiver, and the receiver receives the Bluetooth radio frequency signal, detects a fluctuation in an output voltage signal $V_{DC}$ of the rectifier and amplifies the fluctuation, i.e., amplifying the Bluetooth intermediate frequency signal in an output of the rectifier, and then demodulates the Bluetooth intermediate frequency signal to a Bluetooth baseband signal.

The backscattering module may use a switching or varactor diode to further modulate the Bluetooth intermediate frequency signal to a radio frequency and backscatter the Bluetooth intermediate frequency signal.

Specifically, the transmitter includes a data interface, a Bluetooth packet forming module and a GFSK modulation module. The data interface is connected to the Bluetooth packet forming module, and the Bluetooth packet forming module is connected to the GFSK modulation module. The data interface is configured to input data that needs to be transmitted by IoT devices into the transceiver, and data interfaces such as SPI, I2C or UART may be used; the Bluetooth packet forming module converts incoming bit stream data into a Bluetooth packet compatible to a Bluetooth communication protocol; and the GFSK modulation module modulates a Bluetooth packet signal to an intermediate frequency signal and connects the Bluetooth packet signal to the backscattering module, further modulates the Bluetooth intermediate frequency signal to a radio frequency and backscatters the Bluetooth intermediate frequency signal.

The receiver includes a band-pass filter, an amplifier and a demodulator. The band-pass filter is connected to the amplifier, and the amplifier is connected to the demodulator. A passband of the band-pass filter is a Bluetooth intermediate frequency signal frequency, and the band-pass filter filters out high-frequency carriers; and the amplifier amplifies the Bluetooth intermediate frequency signal, and the demodulator demodulates the Bluetooth intermediate frequency signal to a Bluetooth baseband signal.

The BLE protocol-based battery-free multi-mode transceiver of the present invention carries out Bluetooth packet forming and modulation on baseband data output by the IoT device, so that data information is received by a Bluetooth communication enabled device; and the Bluetooth information transmitted by the Hub can be demodulated and transmitted to control the IoT device. Meanwhile, when a plurality of the transceivers are respectively in the transmitting mode and the receiving mode, the plurality of the transceivers may communicate with each other.

The BLE protocol-based battery-free multi-mode transceiver of the present invention has three working modes: a transmitting mode, a receiving mode and a networking mode. The transceiver can transmit data of the IoT devices to a Bluetooth receiving device, and can also receive a Bluetooth radio frequency signal transmitted from the Hub for setting the IoT devices. Meanwhile, the transceiver supports the networking mode, so that the IoT devices communicate with each other.

Embodiment 1

Figure 2:
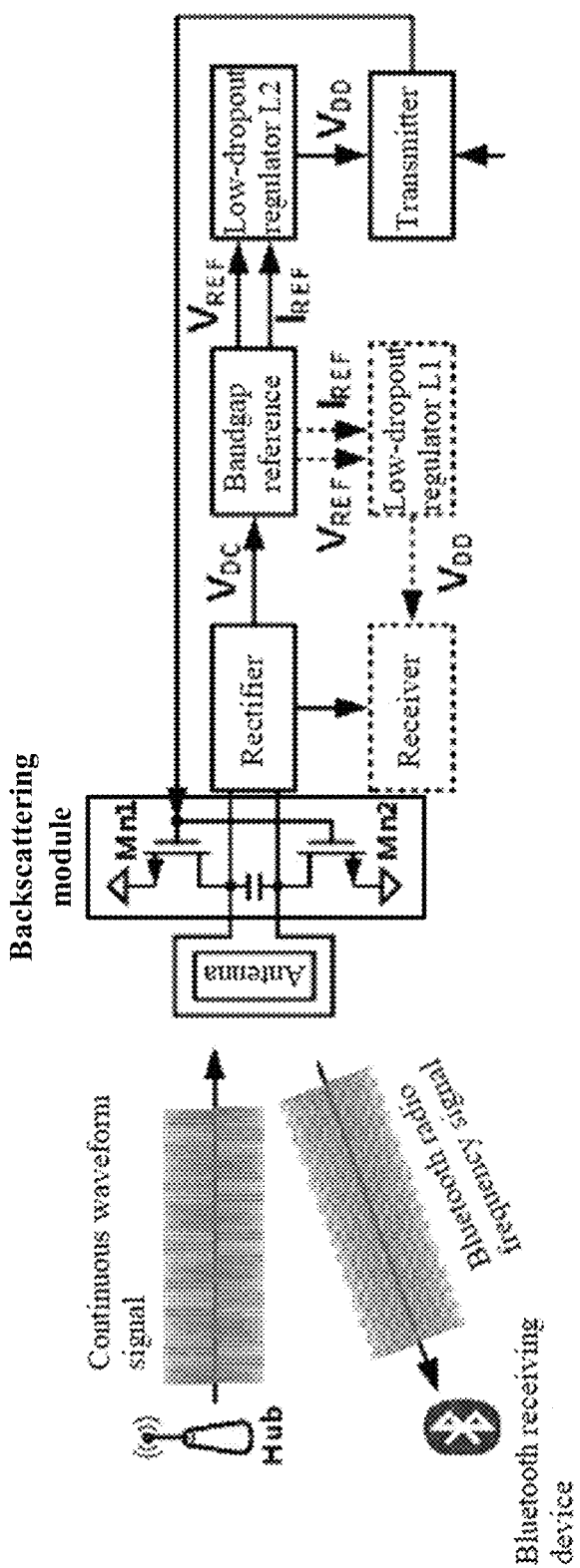
FIG. 2 is a schematic circuit diagram of a transmitting mode according to the present invention.

As shown in FIG. 2, when the transceiver of the present invention is in the transmitting mode, the low-dropout regulator L1 and the receiver are turned off, the low-dropout regulator L2 and the transmitter are turned on, the antenna receives the continuous waveform signal transmitted by the Hub, and the transmitter inputs the baseband signal from the external device, modulates the baseband signal into a GFSK modulated Bluetooth intermediate frequency signal compatible to the BLE protocol, connects the modulated Bluetooth intermediate frequency signal to the backscattering module, modulates the matching/resonant network by the backscattering module to backscatter the signal, and receives the Bluetooth radio frequency signal by a Bluetooth-enabled device.

The Hub transmits a continuous waveform signal with a frequency of 2397.75 Mhz, the wireless energy harvester module collects the continuous waveform signal and supplies power to the whole transceiver. The Bluetooth baseband signal is a 1 Mbps bit stream and generates a Bluetooth packet by the transmitter, then the Bluetooth packet is subjected to GFSK modulation to generate an intermediate frequency signal with a frequency of 4-4.5 MHz, the intermediate frequency signal is connected to the backscattering module, and the matching/resonant network is modulated by the backscattering module to reflect a Bluetooth signal with a center frequency of 2402 MHz and a 37 advertising channel in the BLE protocol. The Bluetooth signal is received by a Bluetooth communication enabled device.

Embodiment 2

Figure 3:
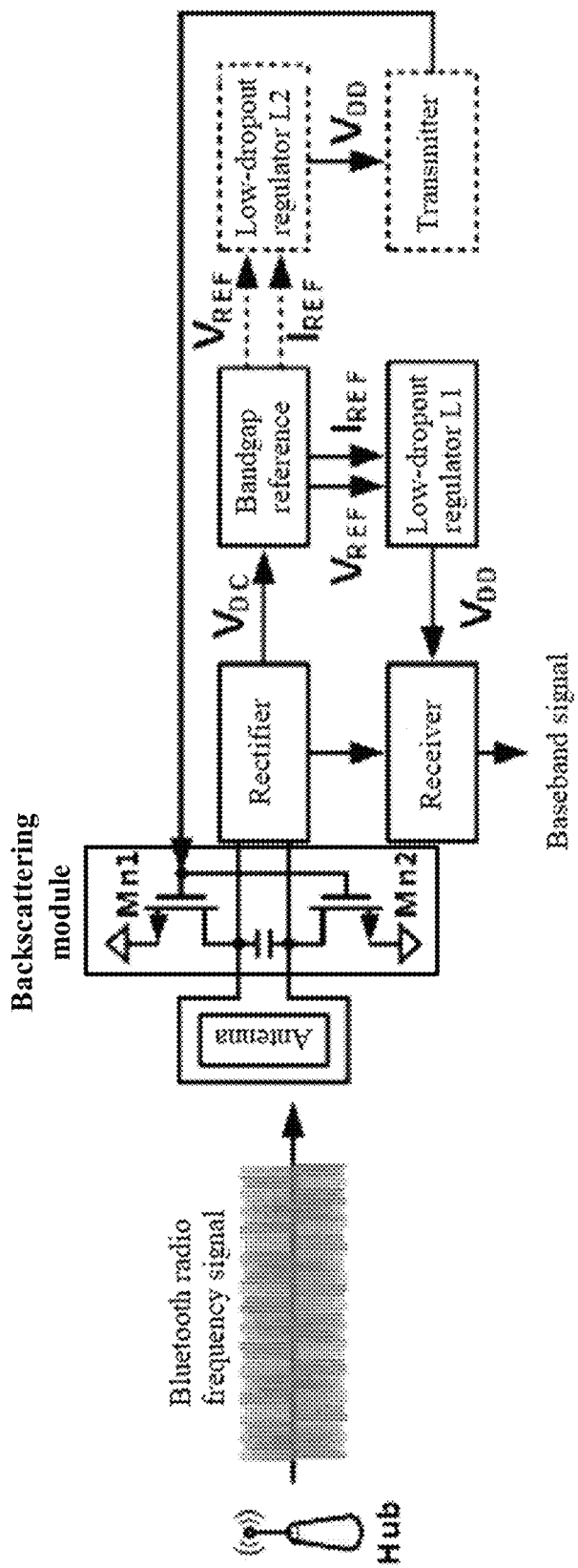
FIG. 3 is a schematic circuit diagram of a receiving mode according to the present invention.

As shown in FIG. 3, when the transceiver of the present invention is in the receiving mode, the low-dropout regulator L2 and the transmitter are turned off, at this time, an output of the transmitter is a low level, and the backscattering module is turned off; and the low-dropout regulator L1 and the receiver are turned on, the antenna receives the Bluetooth radio frequency signal transmitted by the Hub, the Bluetooth intermediate frequency signal is extracted and amplified in an output of the rectifier, and the Bluetooth intermediate frequency signal is demodulated to a Bluetooth baseband signal.

The Bluetooth signal transmitted by the Hub has a Bluetooth envelope with an intermediate frequency signal of 4-4.5 MHz, a carrier thereof is 2397.75 MHz, and the intermediate frequency signal is modulated to a carrier of 2397.75 MHz at the Hub to obtain a Bluetooth radio frequency signal with a frequency of 2402 MHz and a 37 advertising channel in the BLE protocol. The signal is transmitted to the transceiver in a receiving mode. The wireless energy harvester module collects the Bluetooth radio frequency signal and supplies power to the whole transceiver, and at the same time, an envelope of the signal is obtained in the output of the rectifier, i.e., a Bluetooth intermediate frequency signal, high-frequency carriers are filtered out by using the band-pass filter, the Bluetooth intermediate frequency signal is amplified by using the amplifier, and the Bluetooth intermediate frequency signal is demodulated to a Bluetooth baseband signal by using the demodulator.

Embodiment 3

Figure 4:
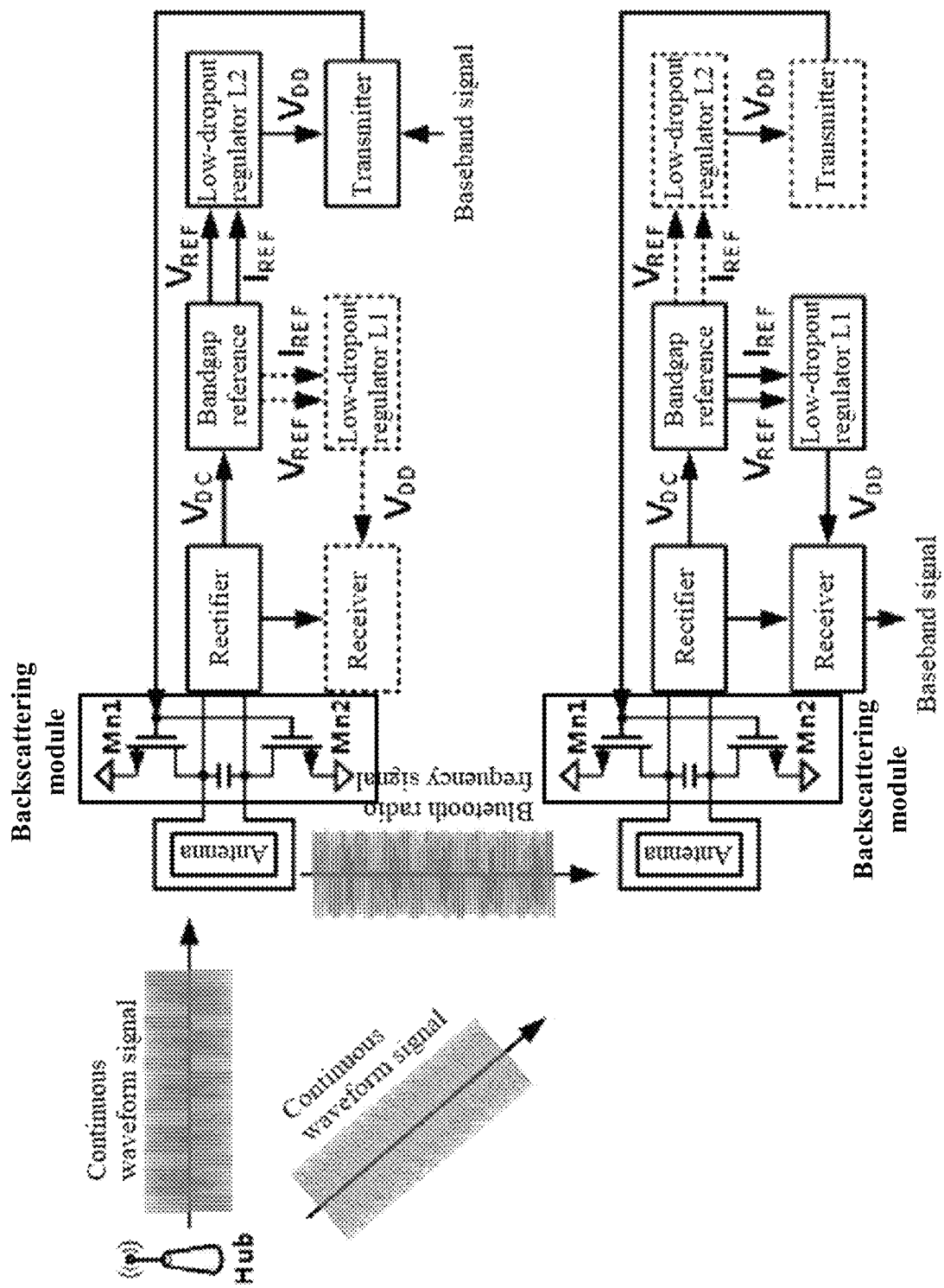
FIG. 4 is a schematic circuit diagram of a networking mode according to the present invention.

As shown in FIG. 4, the transceiver of the present invention is in a networking mode, the networking mode consists of more than two transceivers, and one of the transceivers is in the transmitting mode, receives the continuous waveform signals transmitted by the Hub, and transmits the Bluetooth radio frequency signal; and the other transceivers are in the receiving mode, receive the Bluetooth radio frequency signals transmitted by a previous transceiver, and demodulate the Bluetooth radio frequency signals to Bluetooth baseband signals.

It may be understood that the present invention is described by some embodiments, and it will be appreciated by those skilled in the art that various changes or equivalent substitutions may be made to these features and embodiments without departing from the spirit and scope of the present invention. In addition, under the teachings of the present invention, these features and embodiments may be modified to accommodate specific situations and materials without departing from the spirit and scope of the present invention. Therefore, the present invention is not limited by the specific embodiments disclosed herein, and all embodiments falling within the scope of the claims of the present invention fall within the scope of protection of the present invention.

What is claimed is:

1. A BLE protocol-based battery-free multi-mode transceiver, comprising a wireless energy harvester module, a power management module, a transmitter, a receiver and a backscattering module, wherein the wireless energy harvester module is connected to the power management module, the power management module is connected to the transmitter and the receiver, and the transmitter is connected to the backscattering module;

the wireless energy harvester module comprises an antenna, a matching/resonant network and a rectifier, wherein the antenna is connected to the matching/resonant network, the matching/resonant network is connected to the rectifier, and a continuous waveform signal transmitted by a Hub is rectified to a DC voltage $V_{DC}$ through the rectifier so as to supply power for the whole transceiver;

the power management module comprises a bandgap reference, a low-dropout regulator L1 and a low-dropout regulator L2, wherein the rectifier is connected to the bandgap reference, the bandgap reference is respectively connected to the low-dropout regulator L1 and the low-dropout regulator L2, the low-dropout regulator L2 is connected to the transmitter, and the low-dropout regulator L1 is connected to the receiver; and the power management module provides required stable currents $I_{REF}$ and required voltages $V_{DD}$ for circuits;

the transmitter modulates a baseband signal inputted by an external device into a Gaussian Frequency Shift Keying (GFSK) modulated Bluetooth intermediate frequency signal compatible to a BLE protocol, modulates a received continuous waveform signal by using a backscattering technology, backscatters digital information compatible to the BLE protocol, and transmits a Bluetooth radio frequency signal;

the rectifier is connected to the receiver, and the receiver receives the Bluetooth radio frequency signal, detects a fluctuation in an output voltage signal $V_{DC}$ of the rectifier and amplifies the fluctuation, i.e., amplifying the Bluetooth intermediate frequency signal in an output of the rectifier, and then demodulates the Bluetooth intermediate frequency signal to a Bluetooth baseband signal; and the backscattering module uses a switching or varactor diode to further modulate the GFSK modulated Bluetooth intermediate frequency signal to a radio frequency and backscatter the GFSK modulated Bluetooth intermediate frequency signal.

2. The BLE protocol-based battery-free multi-mode transceiver according to claim 1, wherein the transmitter comprises a data interface, a Bluetooth packet forming module and a GFSK modulation module, wherein the data interface is connected to the Bluetooth packet forming module, and the Bluetooth packet forming module is connected to the GFSK modulation module; the data interface is configured to input data that needs to be transmitted by IoT devices into the transceiver; the Bluetooth packet forming module converts incoming bit stream data into a Bluetooth packet compatible to a Bluetooth communication protocol; and the GFSK modulation module modulates a Bluetooth packet signal to an intermediate frequency signal and connects the Bluetooth packet signal to the backscattering module, further modulates the Bluetooth intermediate frequency signal to a radio frequency signal and backscatters the GFSK modulated Bluetooth intermediate frequency signal.

3. The BLE protocol-based battery-free multi-mode transceiver according to claim 2, wherein the data interface is a spherical peripheral interface (SPI), or an inter-integrated circuit (I2C) interface or a universal asynchronous receiver/transmitter (UART) data interface.

4. The BLE protocol-based battery-free multi-mode transceiver according to claim 1, wherein the receiver comprises a band-pass filter, an amplifier and a demodulator; wherein the band-pass filter is connected to the amplifier, and the amplifier is connected to the demodulator; a passband of the band-pass filter is a Bluetooth intermediate frequency signal frequency, and the band-pass filter filters out high-frequency carriers; and the amplifier amplifies the Bluetooth intermediate frequency signal, and the demodulator demodulates the Bluetooth intermediate frequency signal into the Bluetooth baseband signal.

5. The BLE protocol-based battery-free multi-mode transceiver according to claim 1, wherein the transceiver comprises a transmitting mode, a receiving mode and a networking mode; the transceiver can transmit data of IoT devices to a Bluetooth receiving device, and can also receive the Bluetooth radio frequency signal transmitted from the Hub for setting the IoT devices; and meanwhile, the transceiver supports the networking mode, enabling the IoT devices to communicate with each other.

6. The BLE protocol-based battery-free multi-mode transceiver according to claim 2, wherein when the transceiver is in transmitting mode, the low-dropout regulator L1 and the receiver are turned off, the low-dropout regulator L2 and the transmitter are turned on, the antenna receives the continuous waveform signal transmitted by the Hub, and the transmitter inputs the baseband signal from the external device, modulates the baseband signal into the GFSK modulated Bluetooth intermediate frequency signal compatible to the BLE protocol, connects the GFSK modulated Bluetooth intermediate frequency signal to the backscattering module, modulates the matching/resonant network by the backscattering module to backscatter the signal, and transmits the Bluetooth radio frequency signal to a Bluetooth-enabled device.

7. The BLE protocol-based battery-free multi-mode transceiver according to claim 6, wherein the Hub transmits a continuous waveform signal with a frequency of 2397.75 Mhz, the wireless energy harvester module collects the continuous waveform signal and supplies power to the whole transceiver, the baseband signal is a 1 Mbps bit stream and generates a Bluetooth packet by the transmitter, then the Bluetooth packet is subjected to GFSK modulation to generate an intermediate frequency signal with a frequency of 4-4.5 MHz, the intermediate frequency signal is connected to the backscattering module, and the matching/resonant network is modulated by the backscattering module to reflect a Bluetooth signal with a center frequency of 2402 MHz and a 37 advertising channel in the BLE protocol; and the Bluetooth signal is received by a Bluetooth communication enabled device.

8. The BLE protocol-based battery-free multi-mode transceiver according to claim 4, wherein when the transceiver is in a receiving mode, the low-dropout regulator L2 and the transmitter are turned off, at this time, an output of the transmitter is a low level, and the backscattering module is turned off; and the low-dropout regulator L1 and the receiver are turned on, the antenna receives the Bluetooth radio frequency signal transmitted by the Hub, the Bluetooth intermediate frequency signal is extracted and amplified in the output of the rectifier, and the Bluetooth intermediate frequency signal is demodulated to the Bluetooth baseband signal.

9. The BLE protocol-based battery-free multi-mode transceiver according to claim 8, wherein the Bluetooth signal transmitted by the Hub has a Bluetooth envelope with an intermediate frequency signal of 4-4.5 MHz, a carrier thereof is 2397.75 MHz, and the intermediate frequency signal is modulated to a carrier of 2397.75 MHz at the Hub to obtain the Bluetooth radio frequency signal with a frequency of 2402 MHz and a 37 advertising channel in the BLE protocol; the signal is transmitted to the transceiver in the receiving mode; and the wireless energy harvester module collects the Bluetooth radio frequency signal and supplies power to the whole transceiver, and at the same time, an envelope of the signal is obtained in the output of the rectifier, i.e., the Bluetooth intermediate frequency signal, high-frequency carriers are filtered out by using the bandpass filter, the Bluetooth intermediate frequency signal is amplified by using the amplifier, and the Bluetooth intermediate frequency signal is demodulated to the Bluetooth baseband signal by using the demodulator.

10. The BLE protocol-based battery-free multi-mode transceiver according to claim 1, wherein the transceiver is in the networking mode, the networking mode consists of more than two transceivers, and one of the transceivers is in a transmitting mode, receives the continuous waveform signals transmitted by the Hub, and transmits the Bluetooth radio frequency signal; and the other transceivers are in a receiving mode, receive the Bluetooth radio frequency signals transmitted by a previous transceiver, and demodulate the Bluetooth radio frequency signals to Bluetooth baseband signals.

* * * * *